US010549931B2

(12) United States Patent
Roberge et al.

(10) Patent No.: US 10,549,931 B2
(45) Date of Patent: Feb. 4, 2020

(54) FLOW SPLITTER FOR DISTRIBUTING AGRICULTURAL PRODUCTS AND RELATED SYSTEM

(71) Applicant: CNH Industrial Canada, Ltd., Saskatoon (CA)

(72) Inventors: Martin J. Roberge, Saskatoon (CA); Farid Adel Agina, Calgary (CA); Alexander G. DeMong, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/176,918

(22) Filed: Oct. 31, 2018

(65) Prior Publication Data

US 2019/0071266 A1 Mar. 7, 2019

Related U.S. Application Data

(62) Division of application No. 15/442,985, filed on Feb. 27, 2017, now Pat. No. 10,143,129.

(51) Int. Cl.
*B65G 53/52* (2006.01)
*A01C 7/08* (2006.01)
*A01C 7/20* (2006.01)

(52) U.S. Cl.
CPC ............ *B65G 53/528* (2013.01); *A01C 7/082* (2013.01); *A01C 7/206* (2013.01)

(58) Field of Classification Search
CPC ...... B65G 53/528; B65G 53/56; A01C 7/042; A01C 7/082; A01C 7/084; A01C 7/206; F16L 41/023; F16L 41/03

(Continued)

(56) References Cited

U.S. PATENT DOCUMENTS 1,871,853 A  8/1932  Kennedy
2,171,205 A  8/1939  Zinke
(Continued)

FOREIGN PATENT DOCUMENTS

CN   103335324   10/2013
DE     2114467   11/1972
(Continued)

OTHER PUBLICATIONS

Fertilizer Toolbar, Ag Talk dated Jun. 16, 2015, 22 pages.
Nutri-Tiller 955 & 5310, Strip-Till Applicators, CNH Agriculture, Oct. 10, 2016, 20 pages.

*Primary Examiner* — Joseph A Dillon, Jr.
(74) *Attorney, Agent, or Firm* — Rebecca L. Henkel; Rickard K. DeMille (57) ABSTRACT

A flow splitter for distributing agricultural products may include a splitter body defining an inlet port and a plurality of outlet ports. The flow splitter may also include at least two baffle plates positioned within the splitter body so as to divide an internal flow chamber of the splitter body into a plurality of downstream flow channels. Additionally, the flow splitter may include a divider plate positioned within the splitter body upstream of the baffle plates such that the divider plate is spaced apart from upstream edges of the baffle plates in a direction of the inlet port of the splitter body. The divider plate may be configured to initially divide an input flow of agricultural product received at the input port into two separate product flows for subsequently delivery into the plurality of downstream flow channels.

20 Claims, 9 Drawing Sheets

(58) Field of Classification Search
USPC ...... 406/181, 183; 111/174, 175; 137/561 A, 137/625.11
See application file for complete search history.

(56) References Cited

U.S. PATENT DOCUMENTS

| | | | | |
|---|---|---|---|---|
| 3,334,947 | A * | 8/1967 | Orsi | A24C 5/392 |
| | | | | 406/183 |
| 4,453,866 | A * | 6/1984 | Ryan | B65G 53/40 |
| | | | | 111/34 |
| 4,505,297 | A * | 3/1985 | Leech, III | F22B 37/227 |
| | | | | 137/561 A |
| 4,528,919 | A * | 7/1985 | Harbolt | A01C 23/024 |
| | | | | 111/175 |
| 4,575,284 | A | 3/1986 | Kelm | |
| 4,717,289 | A | 1/1988 | Popowich et al. | |
| 4,824,614 | A * | 4/1989 | Jones | B01F 5/0617 |
| | | | | 137/561 A |
| 5,099,879 | A * | 3/1992 | Baird | F15D 1/02 |
| | | | | 137/561 A |
| 5,101,847 | A * | 4/1992 | Oribe | F24F 7/06 |
| | | | | 137/1 |
| 5,265,547 | A * | 11/1993 | Daws | A01C 7/087 |
| | | | | 111/175 |
| 6,273,648 | B1 | 8/2001 | Poncelet et al. | |
| 7,063,276 | B2 | 6/2006 | Newton | |
| 7,213,617 | B2 | 5/2007 | Snipes et al. | |
| 7,255,123 | B2 * | 8/2007 | Cedergaard | B65G 47/72 |
| | | | | 137/262 |
| 7,875,192 | B2 * | 1/2011 | Eigenmann | B01D 29/01 |
| | | | | 137/561 A |
| 8,001,914 | B2 * | 8/2011 | Peterson | A01C 7/102 |
| | | | | 111/175 |
| 8,403,602 | B2 | 3/2013 | Zarnescu | |
| 8,469,636 | B2 | 6/2013 | Jost et al. | |
| 9,155,243 | B2 | 10/2015 | Heintzman | |
| 9,681,600 | B2 * | 6/2017 | Henry | A01C 7/084 |
| 10,309,577 | B1 * | 6/2019 | Webb | F16L 55/46 |
| 2003/0161694 | A1 * | 8/2003 | Bauver | B65G 53/528 |
| | | | | 406/1 |
| 2009/0165686 | A1 * | 7/2009 | Memory | A01C 7/082 |
| | | | | 111/175 |
| 2011/0311322 | A1 * | 12/2011 | Jost | A01C 7/082 |
| | | | | 406/181 |
| 2011/0315256 | A1 * | 12/2011 | Petersen | A01C 7/084 |
| | | | | 137/583 |
| 2012/0080105 | A1 * | 4/2012 | Bambara | B01D 19/0042 |
| | | | | 137/561 A |
| 2012/0186501 | A1 * | 7/2012 | Zarnescu | B65G 53/528 |
| | | | | 110/101 R |
| 2012/0237304 | A1 * | 9/2012 | Zarnescu | F23K 3/00 |
| | | | | 406/181 |
| 2013/0240434 | A1 * | 9/2013 | Yaeger | B01D 63/10 |
| | | | | 210/321.77 |
| 2014/0026968 | A1 * | 1/2014 | Abate | B01L 3/502784 |
| | | | | 137/1 |
| 2014/0083173 | A1 * | 3/2014 | Rapp | B01L 3/502715 |
| | | | | 73/61.59 |
| 2014/0096851 | A1 * | 4/2014 | Lee | F16L 41/023 |
| | | | | 137/561 A |
| 2014/0158033 | A1 * | 6/2014 | Jagow | A01C 7/082 |
| | | | | 111/174 |
| 2014/0263103 | A1 * | 9/2014 | Peresan | B01D 33/37 |
| | | | | 210/780 |
| 2014/0311598 | A1 | 10/2014 | Hui et al. | |
| 2014/0373940 | A1 * | 12/2014 | Toader, Jr. | F16L 55/07 |
| | | | | 137/267 |
| 2015/0056024 | A1 * | 2/2015 | Rath | F23K 3/02 |
| | | | | 406/3 |
| 2015/0257331 | A1 | 9/2015 | Shivak | |
| 2016/0106026 | A1 | 4/2016 | Roberge et al. | |

FOREIGN PATENT DOCUMENTS

| | | |
|---|---|---|
| EP | 0277288 | 8/1988 |
| FR | 1477271 | 4/1967 |
| SU | 634705 | 11/1978 |

* cited by examiner

FLOW SPLITTER FOR DISTRIBUTING AGRICULTURAL PRODUCTS AND RELATED SYSTEM

CROSS-REFERENCE TO RELATED APPLICATIONS

This application is a divisional of and claims the right of priority to U.S. patent application Ser. No. 15/442,985, filed Feb. 27, 2017, the disclosure of which is hereby incorporated by reference herein in its entirety for all purposes.

FIELD OF THE INVENTION

The present subject matter relates generally to the distribution of an agricultural product(s), such as granular fertilizer and/or seeds, to an associated agricultural implement and, more particularly, to a flow splitter for distributing a flow of agricultural product(s) as well as a related system incorporating the flow splitter.

BACKGROUND OF THE INVENTION

Generally, agricultural implements, such as planting implements, are towed behind a tractor or other work vehicle. These implements typically include one or more ground engaging tools or openers that form a path or trench for the deposition of an agricultural product(s) (e.g., seeds, fertilizer, etc.) into the soil. For example, the openers are used to break the soil to enable seed/fertilizer deposition. After deposition of the seeds/fertilizer, each opener may, for example, be followed by a packer wheel that packs the soil on top of the deposited seeds/fertilizer.

In certain configurations, an air cart is used to meter and deliver agricultural product to the ground engaging tools of an agricultural implement. For instance, a flow of agricultural product (e.g., carried by pressurized air) may be delivered from the air cart through one or more hosed to the implement. In such instance, to allow the flow of agricultural product to be supplied to the various ground engaging tools, the flow must be split or divided into various different outlet hoses via a vertical distribution header or through the use of flow splitters. Unfortunately, conventional distribution headers tend to be quite bulky, which can lead to issues when folding an implement into its transport position. To address these issues, individual two-way or three-way flow splitters have been developed that are designed to split the flow of agricultural product into separate output flows that can be delivered to individual ground engaging tools. However, current flow splitters known in the art still suffer from various drawbacks, including issues associated with a non-uniform distribution of the agricultural product across each of the outlets of the flow splitter.

Accordingly, an improved flow splitter for distributing a flow of agricultural product would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a flow splitter for distributing agricultural products. The flow splitter may include a splitter body extending lengthwise between an upstream end and an opposed downstream end. The splitter body may define an inlet port at or adjacent to its upstream end and a plurality of outlet ports at or adjacent to its downstream end. The splitter body may also define an internal flow chamber extending between the inlet port and the plurality of outlet ports. The flow splitter may also include at least two baffle plates positioned within the splitter body so as to divide the internal flow chamber into a plurality of downstream flow channels. Each downstream flow channel may extend from an upstream edge of one or more of the baffle plates to a corresponding outlet port of the splitter body. Additionally, the flow splitter may include a central divider plate positioned within the splitter body upstream of the baffle plates such that the divider plate is spaced apart from the upstream edges of the baffle plates in a direction of the inlet port of the splitter body. The divider plate may be configured to initially divide an input flow of agricultural product received at the input port into two separate product flows for subsequently delivery into the plurality of downstream flow channels.

In another aspect, the present subject matter is directed to an agricultural product distribution system. The system may generally include an input tube configured to receive an input flow of agricultural product, a plurality of output hoses provided downstream of the input tube, and a flow splitter provided between the input tube and the plurality of output hoses for transporting the input flow agricultural product from the input tube to the plurality of output hoses. The flow splitter may include a splitter body extending lengthwise between an upstream end and an opposed downstream end. The splitter body may define an inlet port at, or adjacent to, its upstream end that is in flow communication with the input tube and a plurality of outlet ports at or adjacent to its downstream end, with each of the outlet ports being in flow communication with a respective output hose of the plurality of output hoses. The splitter body may further define an internal flow chamber extending between the inlet port and the outlet ports. The flow splitter may also include at least two baffle plates positioned within the splitter body so as to divide the internal flow chamber into a plurality of downstream flow channels. Each downstream flow channel may extend from an upstream edge of one or more of the battle plates to a corresponding outlet port of the plurality of outlet ports. Additionally, the flow splitter may include a divider plate positioned within the splitter body upstream of the baffle plates such that the divider plate spaced apart from the upstream edges of the baffle plates in a direction of the inlet port of the splitter body. The divider plate may be configured to initially divide an input flow of agricultural product received at the input port into two separate product flows for subsequently delivery into the plurality of downstream flow channels.

These and other features, aspects and advantages of the present invention will become better understood with reference to the following description and appended claims. The accompanying drawings, which are incorporated in and constitute a past of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the an that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved flow splitter for distributing a flow of agricultural product(s). Specifically, an several embodiments, the flow splitter may include an inlet port and multiple outlet ports, with the inlet port being coupled to an inlet tube or hose (e.g., a dimple tube) and the outlet ports being coupled to respective outlet tubes or hoses. In addition, the flow splitter may include an upstream divider plate for initially dividing the flow of agricultural product received at the inlet port and two or mote downstream baffle plates for further dividing the flow of agricultural product into separate flows for delivery through the outlet ports to the respective outlet hoses. With such a configuration, the upstream divider plate may provide more precise and uniform distribution of the flow of agricultural product within the flow splitter than what can be achieved using only the baffle plates.

Figure 1:
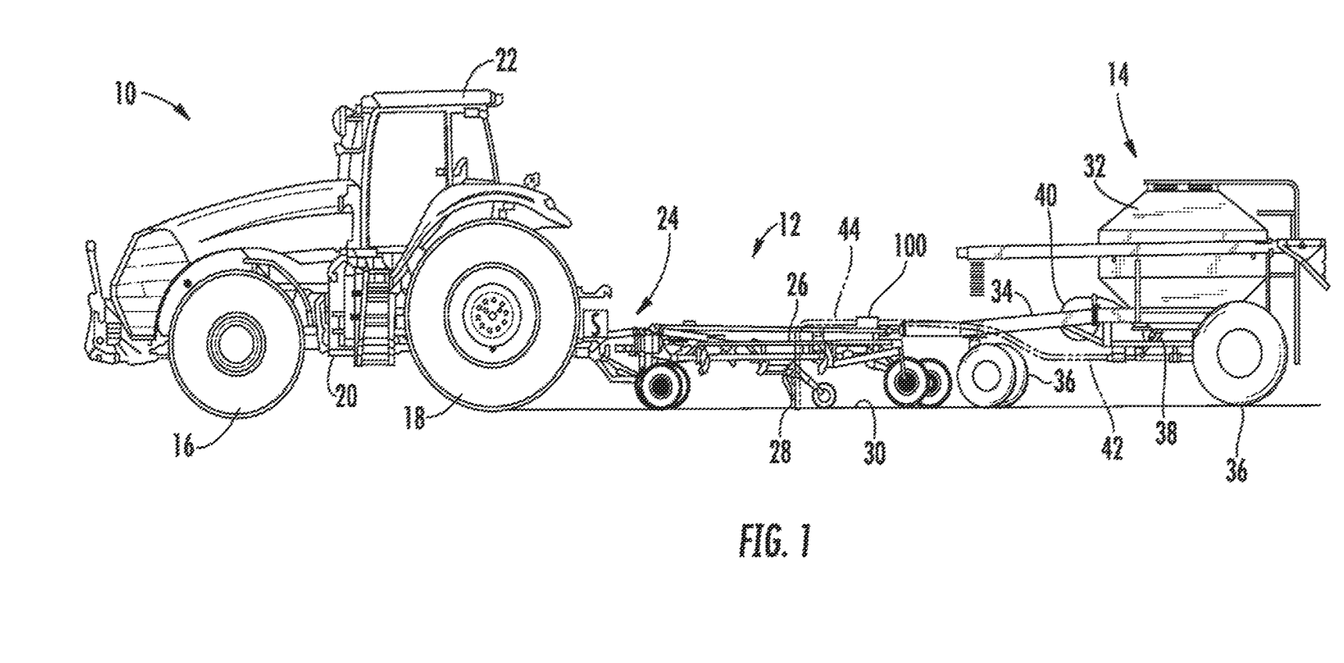
FIG. 1 illustrates a side view of one embodiment of a work vehicle towing an agricultural implement and an associated air cart in accordance with assets of the present subject matter.
Figure 2:
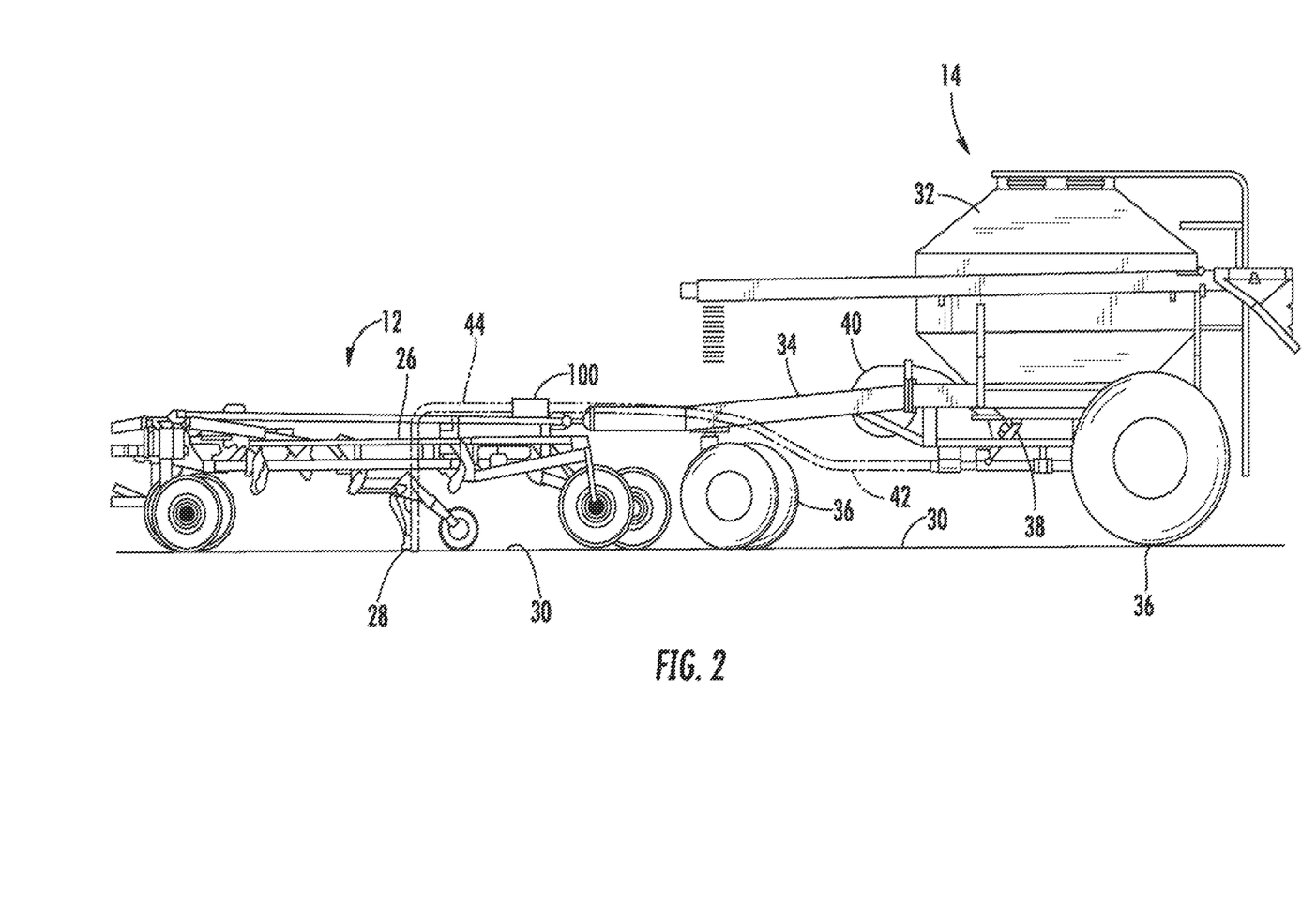
FIG. 2 illustrates a partial, side view of the implement and the air cart shown in FIG. 1.

Referring now to FIGS. 1 and 2, ore embodiment or a work vehicle 10 towing an agricultural implement 12 and an associated air cart 14 is illustrated in accordance with aspects of the present subject matter. Specifically, FIG. 1 illustrates aside view of the work vehicle 10, the implement 12, and the air cart 14. Additionally, FIG. 2 illustrates an enlarged, partial side view of the implement 12 and the air cart 14 shown in FIG. 1. It should be appreciated that, although the work vehicle 10 illustrated herein is configured as a tractor, the work vehicle 10 may generally be configured as any suitable work vehicle known in the art, such as any other agricultural vehicle, and/or the like. It should also be appreciated that, although the implement 14 illustrated herein corresponds to a planting implement or planter, the implement 14 may generally correspond to any suitable equipment or implement, such as a seeder, a fertilizer, a tillage implement, and/or the like.

As particularly shown in FIG. 1, the work vehicle 10 includes a pair of front wheels 16, a pair or rear wheels 18, and a chassis 20 coupled to and supported by the wheels 16, 18. An operator's cab 22 may be supported by a portion of the chassis 20 and may house various control devices (not shown) tor permitting an operator to control the operation of the work vehicle 10. Additionally, the work vehicle 10 may include an engine (not shown) and a transmission (not shown) mounted on the chassis 20. The transmission may be operably coupled to the engine and may provide variably adjusted gear ratios for transferring engine power to the wheels 16, 18 via a differential (not shown).

As shown in FIG. 1, the work vehicle 10 is coupled to the implement 12 via a hitch assembly 24. It should be appreciated that the hitch assembly 24 may correspond to a hitch of rise work vehicle 10 and/or a hitch of the implement 12. Additionally, as shown in FIGS. 1 and 2, the air cart 14 is configured to be coupled to the implement 12 and is towed behind the implement 12 during operation and transport. However, in other embodiments, the air cart 14 may be towed directly behind the work vehicle 10. For example, the air cart 14 may be coupled to the work vehicle 10 vis the hitch assembly 24, with the implement 12 being towed behind the air cart 14. In another embodiment, the implement 12 and the air cart 14 may be part of a single unit that is towed behind the work vehicle 10, or elements of a self-propelled vehicle configured to distribute agricultural product across a field.

As particularly shows in FIG. 2, the implement 12 may include a tool frame 26 and one or more ground engaging tools 28 coupled to the tool frame 26. In several embodiments, the ground engaging tool(s) 28 may be configured to excavate a trench into the soil 30 to facilitate deposition of agricultural product. For example, in the illustrated embodiment, the ground engaging tools 28 may be configured to receive a granular or particulate-type agricultural product (e.g., seed, fertilizer, etc.) from the air cart 14. It should be appreciated that, although only one ground engaging tool 28 is shown in FIGS. 1 and 2; the implement 12 may generally include a plurality of ground engaging tools 28 to facilitate delivery of agricultural product(s) across a wide swath of soil 30. For instance, in one embodiment the implement 12 may include twenty-four ground engaging tools 28 spaced apart across the width of the implement 12. However, in other embodiments, the implement 12 may include any other suitable number of ground engaging tools 28, such as less than twenty-four ground engaging tools or more than twenty-four ground engaging tools.

In the illustrated embodiment the air cart 14 includes a storage tank 32 for storing an agricultural product(s) to be deposited within the field. In addition, the air cart 14 may include a frame 34, wheels 36, a metering system 38, and a pressurized air source 40. In several embodiments, the frame 34 may include a towing hitch (not shown) configured to be coupled to the implement 12 or the work vehicle 10, thereby allowing the air cart 14 to be towed across a field. Moreover, in certain configurations, the storage tank 32 may include multiple compartments for storing various flowable particulate mater example, one compartment may include seeds, and another compartment may include a dry/granular fertilizer. In such configurations, the air cart 14 may be configured to deliver both seed and fertilizer to the implement 12 via the same product distribution system, or via separate distribution systems. As indicated above, as an alternative to the illustrated embodiment, the air cart 14 may be disposed between the work vehicle 10 and the implement 12.

In several embodiments, the agricultural product contained within the storage tank 32 may be gravity fed into the metering system 38, thereby allowing the metering system 38 to distribute a desired quantity of the product to the ground engaging tools 28 of the implement 12. A is generally understood, the pressurized air flow from the air source 40 may then carry the product through one or more hoses 42 to the implement 12. As particularly shown in FIG. 2, in several embodiments, the hose 42 may be coupled to one or more flow splitters 100 supported on the implement 12. As will be described below, the flow splitters(s) 100 may be configured to split the flow of agricultural product into multiple separate flows, thereby allowing multiple ground engaging tools 28 to be supplied with agricultural product for deposition into the soil 30. For instance, in several embodiments, each flow splitter 100 may correspond to a three-way splitter configured to split the flow of agricultural product into three separate flows for delivery to three separate ground engaging tools 28, with each flow being delivered to its corresponding ground engaging tool 28 via an output hose 44 coupled between the flow splitter 100 and the ground engaging tool 28. In such embodiments, eight flow splitters 100 may, for example, be utilized to deliver agricultural products to twenty-four separate ground engaging tools 28.

Figure 3:
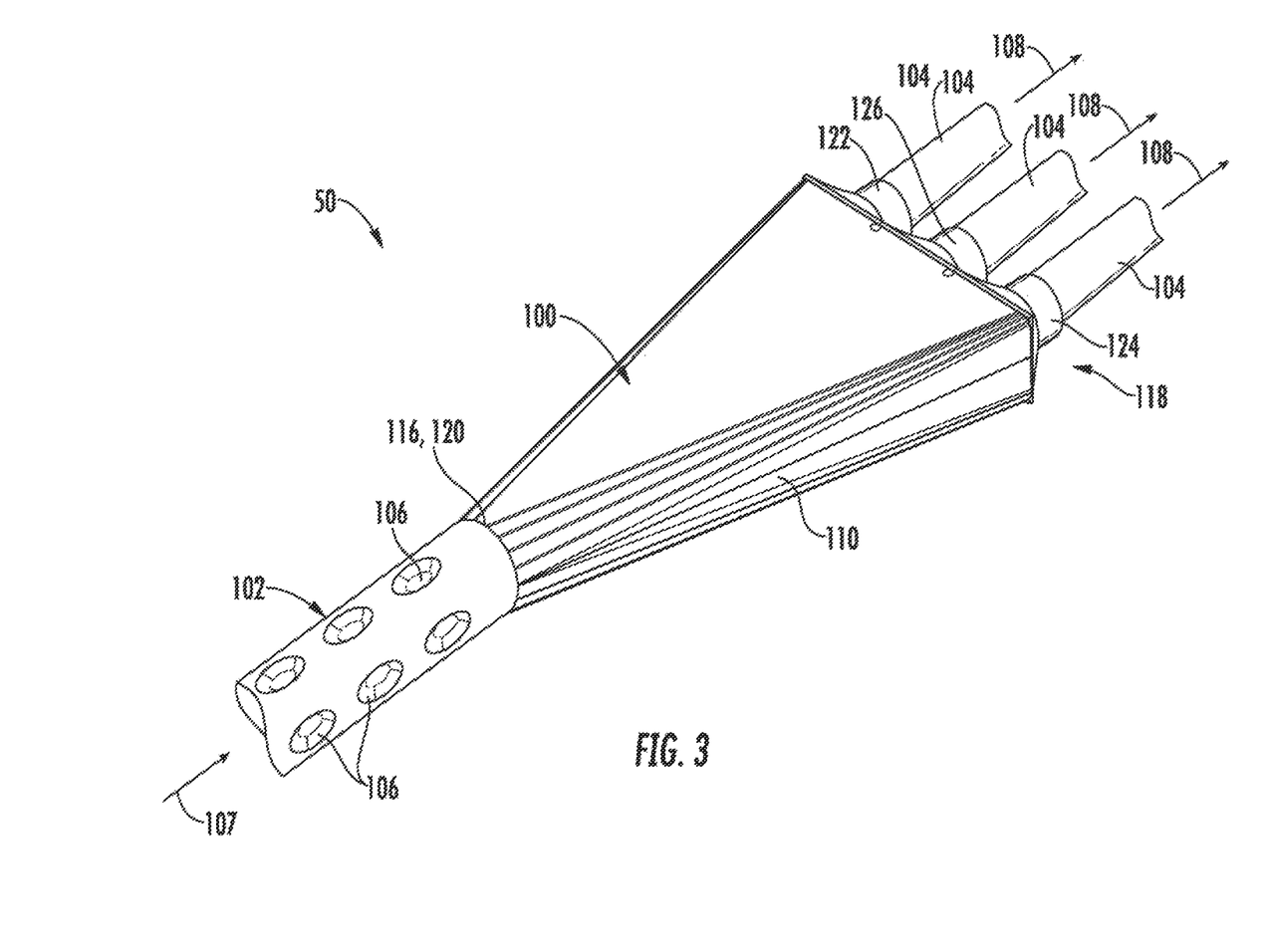
FIG. 3 illustrates a perspective view of one embodiment of an agricultural product distribution system in accordance with aspects of the present subject matter, particularly illustrating the system including input tube, a flow splitter, and a plurality output hoses.
Figure 4:
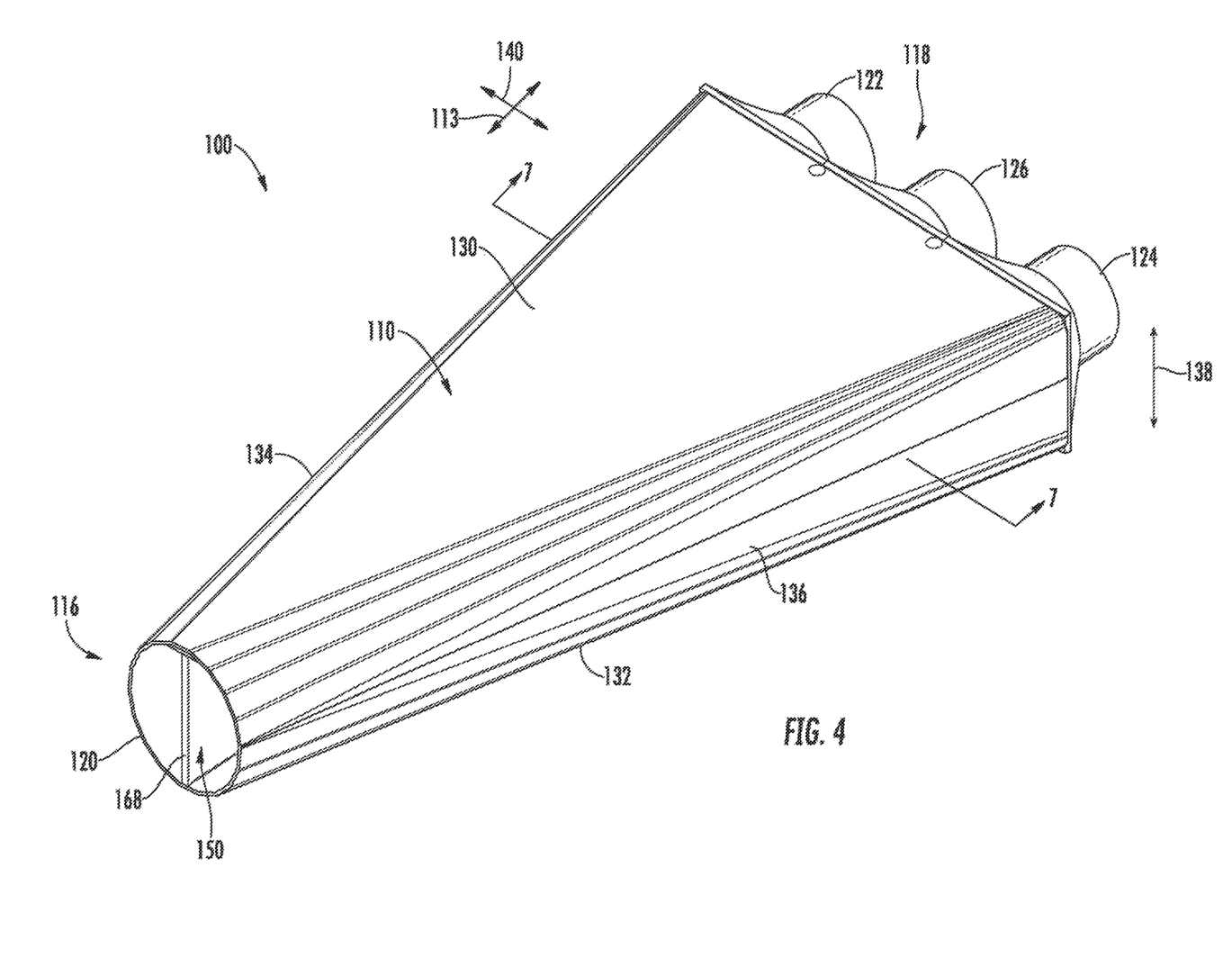
FIG. 4 illustrates a perspective view of the flow splitter shown in FIG. 3.
Figure 5:
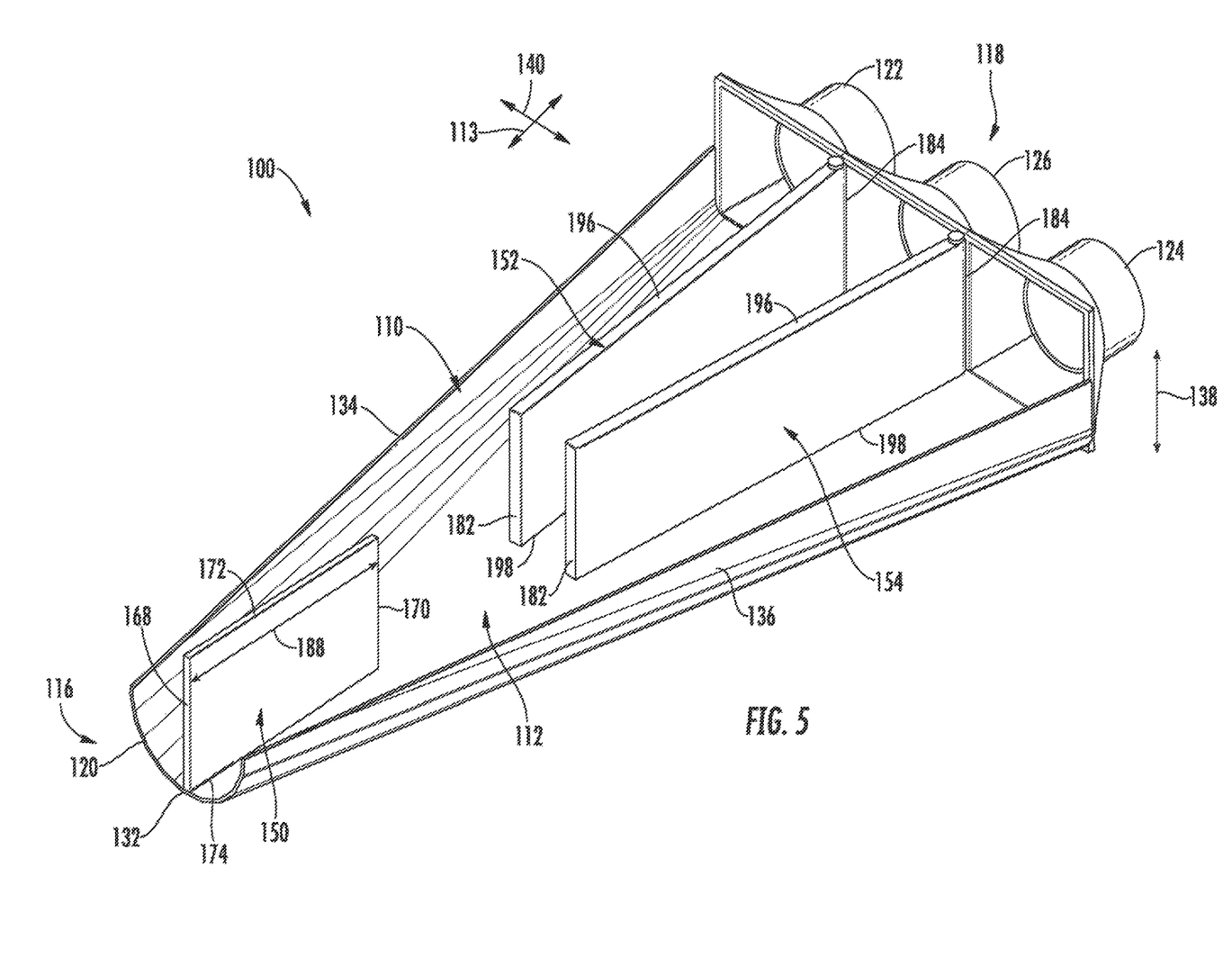
FIG. 5 illustrates another perspective view of the flew splitter shown in FIG. 3, particularly illustrating upper half of the outer body of the flow splitter removed for purposes of illustration.
Figure 6:
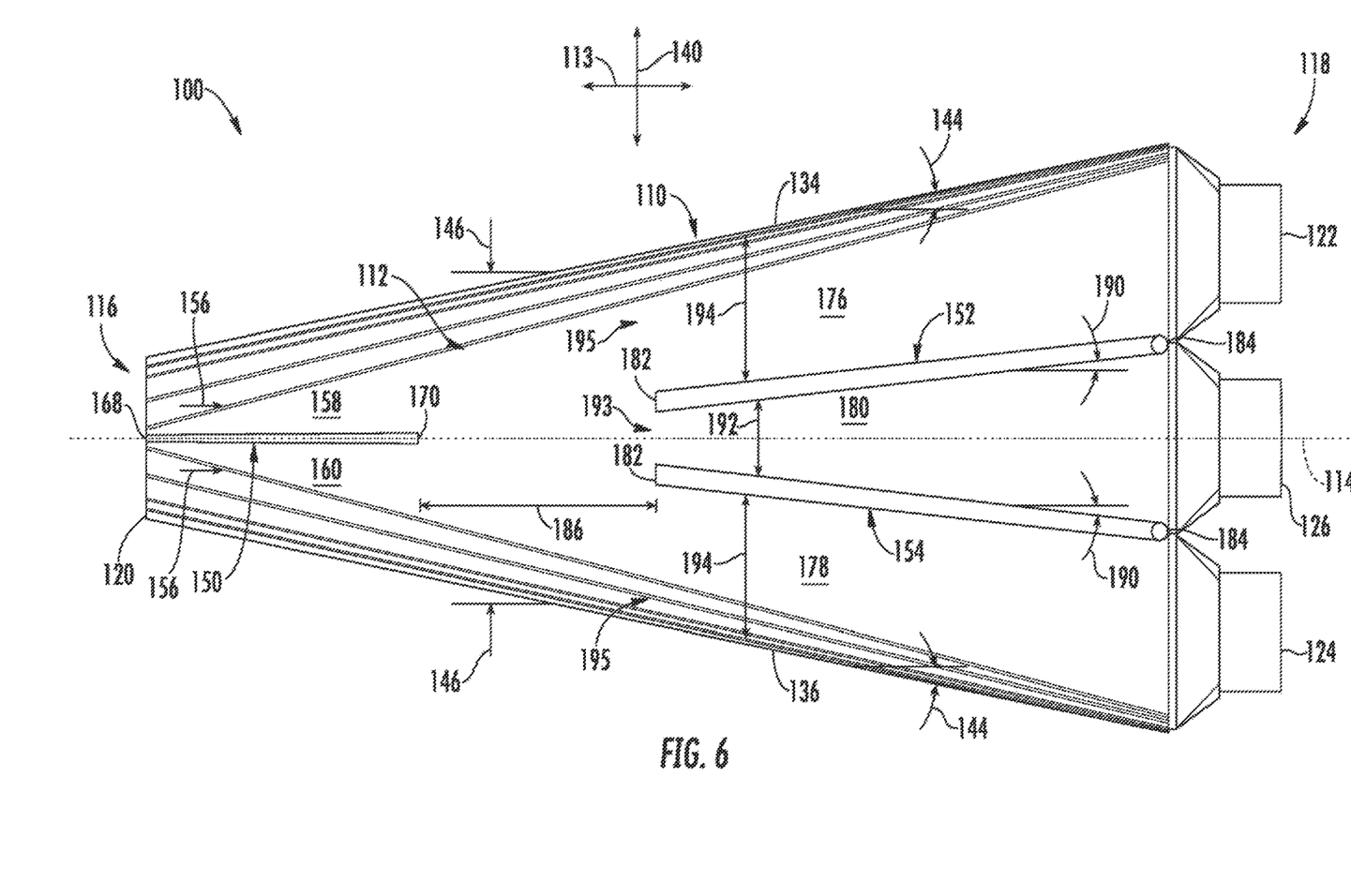
FIG. 6 illustrates a top view of the flow splitter shows an FIG. 5.
Figure 7:
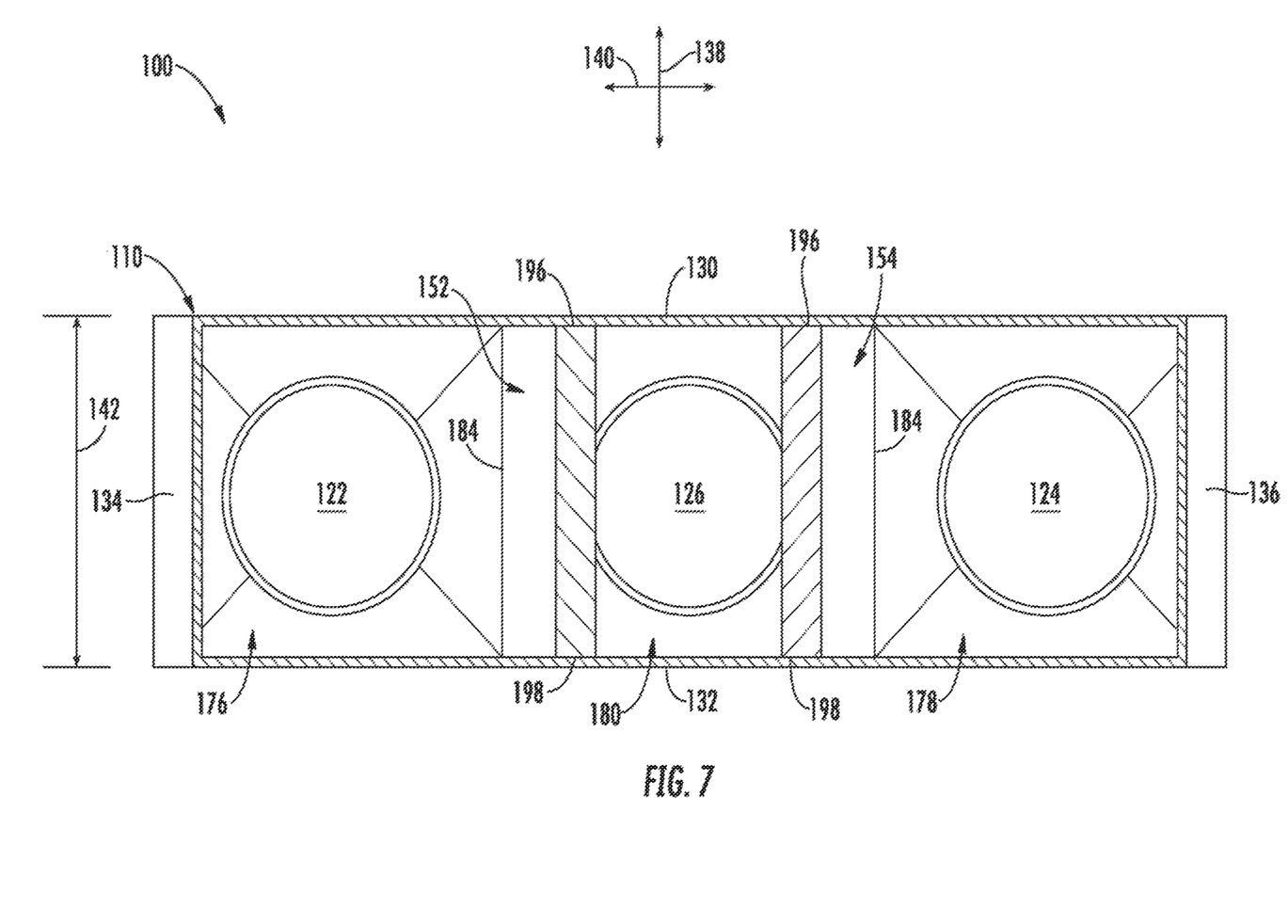
FIG. 7 illustrates a cross-sectional view of the flow splitter shown in FIG. 4 taken about line 7-7.
Figure 8:
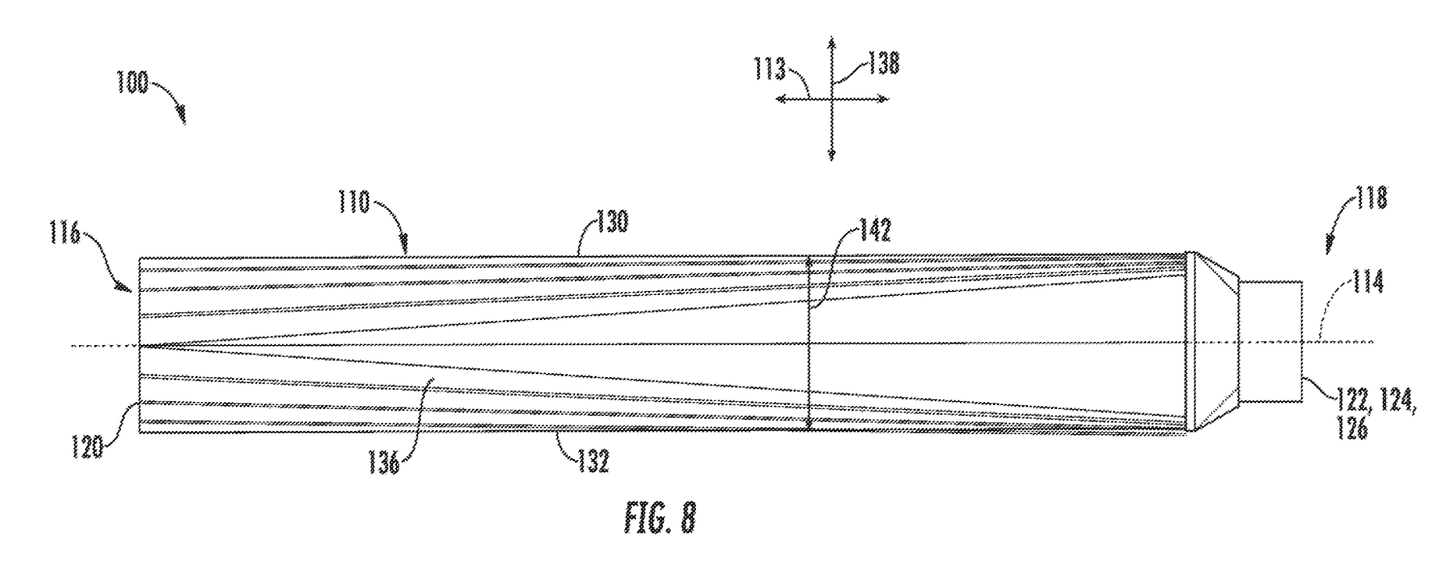
FIG. 8 illustrates a side view of the flow splitter shown in FIG. 4.
Figure 9:
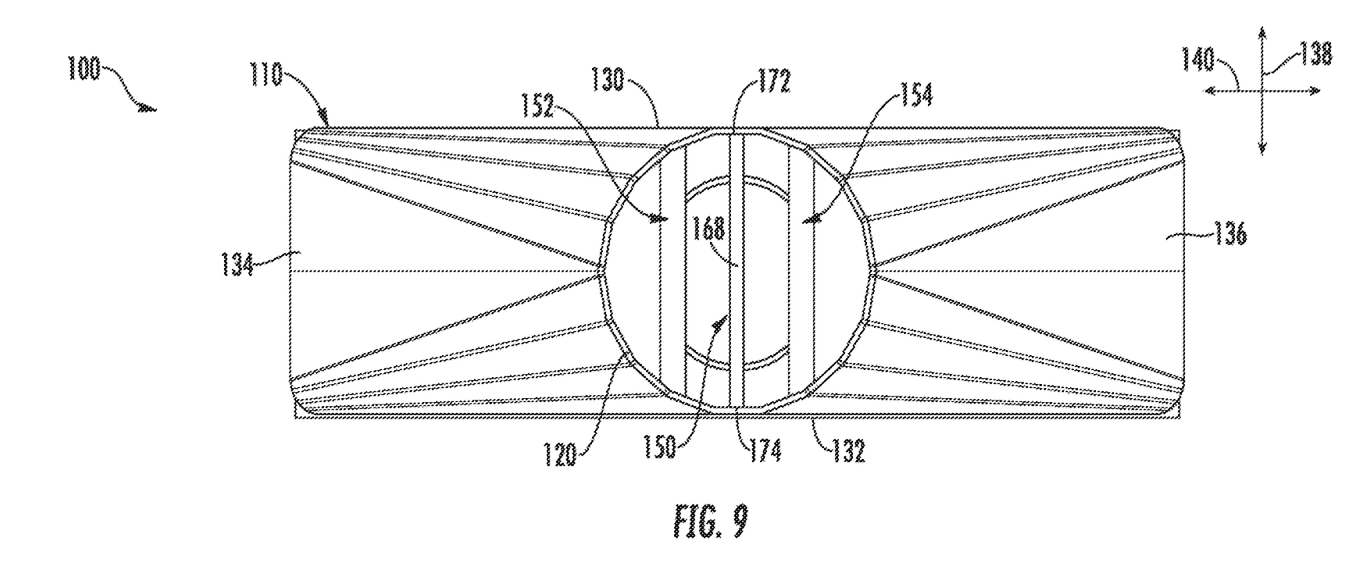
FIG. 9 illustrates a front view of the flow splitter shown in FIG. 4.

Referring now to FIGS. 3-9 several views of one embodiment of a flow splitter 100 and an associated agricultural product distribution system 50 for distributing a flow of agricultural product are illustrated in accordance with aspects of the present subject matter. Specifically, FIG. 3 illustrates a perspective view of one embodiment of the agricultural product distribution system 50, particularly illustrating the system 50 including the flow splitter 100 coupled between an associated input tube 102 and corresponding output hoses 104. FIGS. 4 and 5 illustrate perspective views of the flow splitter 100 shown in FIG. 3, with FIG. 5 illustrating the flow splitter 100 with an upper half of its outer body 110 removed for purposes of illustration. Additionally, FIG. 6 illustrates a top view of the flow splitter 100 shown in FIG. 5 and FIG. 7 illustrates a cross-sectional view of the flow splitter 100 shown in FIG. 4 taken about line 7-7. Moreover, FIGS. 8 and 9 illustrate side and front views, respectively, of the flow splitter 100 shown in FIG. 4.

As shown in the illustrated embodiment, the flow splitter 100 is configured as a three-way splitter such that a flow of agricultural product (e.g., as indicated by arrow 507 in FIG. 3) received via the input tube 102 is split into three separate flows (e.g., as indicated by arrows 108 in FIG. 3) for delivery to three separate output hoses 104. However, in other embodiments, the flow splitter 100 may be configured to split the flow of agricultural product into more than three separate flows, such as four or more separate flows for delivery to four or more separate output hoses 104.

It should be appreciated that, in general, the input tube 102 may correspond to any suitable tube or conduit for supplying agricultural product to the flow splitter 100. However, as shown in FIG. 3, in one embodiment, the input tube 102 may correspond to a dimple tube including a plurality of inwardly extending dimples 106 formed along its exterior. In such an embodiment, the dimples 106 may facilitate consistent distribution of the agricultural product contained within the product flow being supplied into the flow splitter 100 via the input tube 102.

It should also be appreciated that, in one embodiment, the input tube 102 may be coupled to or form part of the hose(s) 42 extending from the air cart 14 (FIGS. 1 and 2) such that the flow of agricultural product directed through such hose (s) 42 is received within the input tube 102. Similarly, in one embodiment the output hoses 104 may be coupled to or form part of the output hoses 44 described above with reference to FIGS. 1 and 2. As such, the flow of agricultural product expelled from the flow splitter may be transported through the hoses 104/44 to each respective ground engaging tool 28.

As shown in the illustrated embodiment, the flow splitter 100 may generally include a splitter body 110 defining an internal flow chamber 112 (FIGS. 5 and 6) for receiving and containing the flow of agricultural product being transported between the input tube 102 and the associated output noses 104. In general, the splitter body 110 may be configured to extend in a lengthwise or flow direction (e.g., as indicated by arrow 113 in FIGS. 4-6 and 8) along a central axis 114 (FIG. 6) between an upstream end 116 and an opposed downstream end 118. As particularly shown in FIGS. 4 and 9, the splitter body 110 may define an inlet port 120 at its upstream end 116 for receiving the flow of agricultural product from the input tube 102. For instance, as shown in FIG. 3, the input tube 102 may be coupled to the splitter body 110 at the inlet port 120 such that the flow of agricultural product supplied through the input tube 102 (e.g., front the air cart 14) is received within the internal flow chamber 112 defined by the splitter body 10. Additionally, as shown in FIGS. 4-7, the splitter body 110 may define 8 plurality of output ports at its downstream end 118 for directing the flow of agricultural product supplied through the splitter body 110 to the associated output hoses 104. For instance, in the illustrated embodiment, when the flow splitter 100 is configured as a three-way splitter, the splitter body 110 may include three outlet ports (e.g., a first side outlet port 122, a second side outlet port 124 and a central outlet port 126 positioned between the side outlet ports 122, 124) defined at or adjacent to its downstream end 118 for directing the flow of agricultural product to the associated output hoses 104 for subsequent delivery to the ground engaging tools 28 of the implement 12. In several embodiments, the inlet port 120 and/or the central outlet port 126 may be aligned with the central axis 114 of the splitter body 110. For instance, the central axis 114 may, in one embodiment, pass through the center of both the inlet port 120 and the central outlet port 126.

Additionally, as shown in FIGS. 4 and 7-9, the splitter body 110 may generally include upper and lower walls 130, 132 extending in the lengthwise direction 113 between the upstream and downstream ends 116, 118 of the body 110 and first and second side-walls 134, 136 extending between the upper and lower walls 130, 132. In such an embodiment the internal flow chamber 112 of the flow splitter 100 may generally be defined in a heightwise direction of the splitter body 110 (e.g., as indicated by arrow 131 in FIGS. 4, 5, and 7-9) between the upper and lower walls 130, 132 and in a cross-wise direction of the splitter body 110 (e.g., as indicated by arrow 140 in FIGS. 4-7 and 9) between the opposed sidewalls 134, 136.

In one embodiment, the upper and lower walls 130, 132 may be substantially planar and may extend generally parallel to each other between the upstream and downstream ends 116, 118 of the splitter body 110. For instance, as shown in FIG. 8, the upper and lower walls 130, 132 may extend generally parallel to each other such that the splitter body 110 defines a substantially constant height 142 between its upstream and downstream ends 116, 118. It should be appreciated that, as described herein, the height 142 of the splitter body 110 defined between the upper and lower walls 130, 132 is "substantially constant" if the variation in the height 142 defined at my two locations between the upper and lower walls 130, 132 is less than 20%, such as less than a 15% height variation or less than a 10% height variation.

Additionally, as shown in FIGS. 4 and 5, the side walls 134, 136 of the splitter body 110 may be configured to transition from a generally curved profile at the upstream end 116 of the splitter body 110 (e.g., the curved portion of each sidewall 134, 136 forming the inlet port 120) to a generally planar profile at or adjacent to the downstream end 118 of the splitter body 110. Moreover, as shown in FIG. 6, the sidewalls 134, 136 may be configured to taper outwardly as the splitter body 110 extends front its upstream end 116 to its downstream 118, such as by defining an outward taper angle 144 relative to the central 114 of the splitter body 110. As such, a cross-wise width 140 (FIG. 6) of the splitter body 110 may generally increase between the inlet port 120 and the outlet ports 122, 124, 126, thereby allowing the cross-sectional flow area defined by the internal flow chamber 112 to be increased as the flow of agricultural product is supplied from the inlet port 120 to the outlet ports 122, 124, 120.

Moreover, as shown in FIGS. 5-7 and 9, the flow splitter 100 may also include an upstream divider plate 150 and first and second downstream baffle plates 152, 154 positioned within the splitter body 110. In general, the divider plate 150 may be configured to divide an upstream portion of the internal flow chamber 112 of the splitter body 110 into two separate flow channels for splitting the flow of agricultural product received at the inlet port 120 of the splitter body 110 into two separate upstream product flows (e.g., indicated by arrows 156 in FIG. 6). Specifically, as shown in FIG. 6, a first upstream flow channel 153 may be defined between the divider plate 150 and the first sidewall 134 of the splitter body 110 while a second upstream flow channel 160 may be defined between the divider plate 150 and the opposed second sidewall 130 of the splitter body 110. As such, when a flow agricultural product is received within the splitter body 110 at the inlet port 120, the flow may be initially divided between the first and second upstream flow channels 158, 160.

In several embodiments, the divider plate 138 may be configured to extend lengthwise between an upstream edge 168 (FIG. 6) and a downstream edge 170 (FIG. 6), with the upstream edge 168 of the divider plate 150 being positioned at or adjacent to the upstream end 116 of the splitter body 110. For instance, as shown in FIG. 6, the upstream edge 168 of the divider plate 110 is positioned directly at the inlet port 120 defined at the upstream end 116 of the splitter body 110. However, in other embodiments, the upstream, edge 168 of the divider plate 150 may be offset from the inlet port 120 such that the upstream edge 168 is located downstream of the upstream end 110 of the splitter body 110.

Additionally, as shown in FIG. 6, in one embodiment, the divider plate 150 may be configured to extend lengthwise along and/or parallel to the central axis 114 of the splitter body 110. As such, across-wise width (not shown) of each upstream flow channel 158, 160 may generally increase as the flow channel 158, 160 extends towards the downstream edge 170 of the divider plate 150 due to the tapered configuration of the sidewalls 134, 136 of the splitter body 110.

Moreover, in one embodiment, the divider plate 150 may be configured to extend in the heightwise direction 138 of the splitter body 110 the full distance or height defined between the upper and lower walls 130, 132 such that the upstream flow channels 158, 160 are fluidly isolated from each other between the upstream and downstream edges 168, 170 of the divider plate 150. For instance, as shown in FIG. 9, the divider plate 150 may be configured to extend between a top end 172 and a bottom end 174, with the top end 172 being coupled to and/or contacting the upper wall 130 of the splitter 110 and the bottom end 124 being coupled to and/or contacting the lower wall 132 of the splitter body 110.

As indicated above, the flow splitter 100 may also include first and second baffle plates 152, 154 positioned within the splitter body 110 at a location downstream of the divider plate 150. In general, the baffle plates 151, 154 may be configured to divide a downstream portion of the infernal flow chamber 112 of the splitter body 110 into three separate flow channels for delivering agricultural products to the respective outlet ports 122, 124, 126. Specifically, as shown in FIG. 6, a first side flow channel 176 may be defined between the first baffle plate 152 and the adjacent sidewall 134 of the splitter body 110 for delivering a flow of agricultural product to the first side outlet port 122 while a second side flow channel 178 may be defined between the second baffle plate 154 and the adjacent sidewall 136 of the splitter body 110 for delivering a flow of agricultural product to the second side outlet port 124. Additionally, as shown in the illustrated embodiment, a central flow channel 180 may be defined directly between the first and second baffle plates 152, 154 for delivering a flow of agricultural product to the central outlet port 126.

As shown in FIG. 6, an several embodiments, each battle plate 152, 154 may be configured to extend lengthwise between an upstream edge 182 and a downstream edge 184, with the upstream edges 182 of the baffle plates 152, 154 being spaced apart from the downstream edge 170 of the divider plate 150 by a given lengthwise distance 186. Such lengthwise spacing between the divider plate 150 and the downstream baffle plates 152, 154 may generally allow the separate upstream flows 156 of agricultural product traveling along each side of the divider plate 150 to be adequately distributed between the downstream flow channels 176, 178, 180 defined by the baffle plates 152, 154. For instance, a low pressure zone or pocket may be defined directly downstream of the downstream edge 170 of the divider plate 150 that serves to draw a portion of each upstream flow 156 of agricultural product towards the central axis 114 of the splitter body 110 to allow a portion of each flow 156 to be received within the central flow chamber 180 defined between the baffle plates 152, 154. As such, the flow of agricultural product may be uniformly distributed between the various downstream slow channels 176, 178, 180 for subsequent delivery to the respective outlet pons 122, 124, 126.

In several embodiments, the lengthwise distance 156 defined between the divider plate 150 and the battle plates 152, 154 may be defined as a function of a length 188 (FIG. 5) of the divider plate 150 between its upstream and downstream edges 168, 170. For instance, in one embodiment, the lengthwise distance 186 defined between the divider plate 150 and the baffle plates 152, 154 may be greater than about 50% of the length 188 of the divider plate 150, such as a lengthwise distance 186 ranging from about 70% to about 110% of the length 188 of the divider plate 150 or from about 80% to about 100% of the length 188 of the divider plate 150 or from about 85% to about 95% of the length 188 of the divider plate 150.

As shown in FIG. 6, in one embodiment, each baffle plate 152, 154 may be angled outwardly relative to the central axis 114 of the splitter body 110 between its upstream and downstream edges 182, 184 at a battle angle 190 such that a cross-wise width 192 of the central flow channel 180 increases as the flow channel 180 extends towards the central outlet port 126. In such an embodiment, the baffle angle 190 may be less than the taper angle 144 of the sidewalk 134, 136 of the splitter body 110 so that a cross-wise width 194 of each side flow channel 176, 178 similarly increases as each side flow channel 176, 178 extends towards its respective outlet port 122, 124. Additionally, as shown in FIG. 6, the baffle plates 152, 154 may be offset or spaced apart from the central axis 114 of the splitter body 110 in the cross-wise direction 140 of the flow splitter 100. For instance, the upstream, edge 168 of each baffle plate 152, 154 may be spaced apart from the central axis 114 by a giver, cross-wise distance (not shown), with the cross-wise distance defined between each baffle plate 152, 154 and the central axis 114 generally increasing in the downstream direction due to the angled orientation of each baffle plate 152, 154. In one embodiment, the baffle plates 152, 154 may be oriented symmetrically relative to the central axis 114. In such an embodiment, the cross-wise distance defined between the first baffle plate 152 and the central axis 114 may be equal to the cross-wise distance defined between the second baffle plate 154 and the central axis 114 at each lengthwise station along the baffle plates 152, 154 so that the central flow channel 180 is generally centered along the central axis 114.

As shown in FIG. 6, in several embodiments, the cross-wise width 192 of an inlet portion 193 of the central flow channel 180 defined between the upstream edges 182, 184 of the baffle plates 152, 154 may be less than the cross-wise width 194 of an inlet portion 195 of each side flow channel 176, 178 defined between the upstream edge 182 of the corresponding baffle plate 152, 154 and the adjacent sidewall 134, 136 of the splitter body 110. For instance, in one embodiment, the cross-wise width 192 of the inlet portion 193 of the central flow channel 180 may range from about 30% to about 70% of the cross-wise width 194 of the inlet portion 195 of each outer flow channel 176, 178, such as a cross-wise width 192 ranging from about 40% to about 60% of the cross-wise width 194 of the inlet portion 195 of each outer flow channel 176, 178 or a cross-wise width 192 ranging from about 45% to about 55% of the cross-wise width 194 of the inlet portion 195 of each outer flow channel 176, 178.

Additionally, in one embodiment, each baffle plate 152, 154 may be configured to extend in the heightwise direction 138 of the splitter body 110 the full distance or height defined between the upper and lower walls 130, 132 such that the downstream flow channels 176, 178, 180 are fluidly isolated from one another between the upstream and downstream edges 182, 184 of the baffle plates 152, 154. For instance, as shown in FIG. 7, such baffle plate 152, 154 may be configured to extend between a top end 196 and a bottom end 198, with the top end 196 being coupled to and/or contacting the upper wall 130 of the splitter body 110 and the bottom end 198 being coupled to and/or contacting the lower wall 132 of the splitter body 110.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A flow splitter for distributing agricultural products, the flow splitter comprising:
    a splitter body extending in a lengthwise direction between an upstream end and an opposed downstream end, the splitter body defining a central axis extending between its upstream and downstream ends along the lengthwise direction, the splitter body further defining an inlet port at or adjacent to its upstream end and a plurality of outlet ports at or adjacent to its downstream end, the splitter body further defining an internal flow chamber extending between the inlet port and the plurality of outlet ports;
    at least two baffle plates positioned within the splitter body so as to divide the internal flow chamber into a plurality of downstream flow channels, each downstream flow channel extending from an upstream edge of one or more of the at least two baffle plates to a corresponding outlet port of the plurality of outlet ports; and
    a divider plate positioned within the splitter body upstream of the at least two baffle plates such that the divider plate is spaced apart from the upstream edges of the at least two baffle plates in a direction of the inlet port of the splitter body, the divider plate being configured to initially divide an input flow of agricultural product received at the input port into two separate product flows for subsequent delivery into the plurality of downstream flow channels, the divider plate extending along the central axis in the length-wi se direction from an upstream edge of the divider plate to a downstream edge of the divider plate, the divider plate defining a planar profile along the central axis in the length-wise direction.

2. The flow splitter of claim 1, wherein the divider plate is configured to initially divide the input flow of agricultural product received at the input port into two separate, substantially equal product flows upstream of the at least two baffle plates.

3. The flow splitter of claim 2, wherein the splitter body extends in a cross- wise direction between a first sidewall and a second sidewall, the divider plate being spaced apart equally from the first sidewall and the second sidewall in the cross-wise direction.

4. The flow splitter of claim 1, wherein the upstream edge of the divider plate is positioned at or adjacent to the upstream end of the splitter body.

5. The flow splitter of claim 1, wherein at least one of the inlet port or a central outlet port of the plurality of outlet ports is aligned with the central axis.

6. The flow splitter of claim 1, wherein the at least two baffle plates are angled relative to the central axis.

7. The flow splitter of claim 1, wherein the at least two baffle plates are offset from the central axis in a cross-wise direction of the splitter body, the cross-wise direction extending perpendicular to the central axis.

8. The flow splitter of claim 1, wherein the divider plate is spaced apart from the upstream edges of the at least two baffle plates by a lengthwise distance in the lengthwise direction that is greater than about 50% of the length of the divider plate.

9. The flow splitter of claim 8, wherein the lengthwise distance ranges from about 80% to about 100% of the length of the divider plate.

10. The flow splitter of claim 1, wherein the at least two baffle plates include a first baffle plate and a second baffle plate spaced apart from the first baffle plate in a cross-wise direction of the splitter body such that a first downstream flow channel of the plurality of flow channels is defined directly between the first and second baffle plates, both of the first and second baffle plates being spaced apart from the first and second sidewalk in the cross-wise direction of the splitter body, the first downstream flow channel extending from an upstream edge of the first and second baffle plates to a corresponding outlet port of the plurality of outlet ports.

11. The flow splitter of claim 10, wherein the divider plate is substantially aligned with the first downstream flow channel along the lengthwise direction of the splitter body.

12. An agricultural product distribution system, comprising:
an input tube configured to receive an input flow of agricultural product;
a plurality of output hoses provided downstream of the input tube; and
a flow splitter provided between the input tube and the plurality of output hoses for transporting the input flow of agricultural product from the input tube to the plurality of output hoses, the flow splitter comprising:
a splitter body extending in a lengthwise direction between an upstream end and an opposed downstream end, the splitter body defining a central axis extending between its upstream and downstream ends along the lengthwise direction, the splitter body further defining an inlet port at or adjacent to its upstream end that is in flow communication with the input tube and a plurality of outlet ports at or adjacent to its downstream end, each of the plurality of outlet ports being in flow communication with a respective output hose of the plurality of output hoses, the splitter body further defining an internal flow chamber extending between the inlet port and the plurality of outlet ports;
at least two baffle plates positioned within the splitter body so as to divide the internal flow chamber into a plurality of downstream flow channels, each downstream flow channel extending from an upstream edge of one or more of the at least two baffle plates to a corresponding outlet port of the plurality of outlet ports; and
a divider plate positioned within the splitter body upstream of the at least two baffle plates such that the divider plate is spaced apart from the upstream edges of the at least two baffle plates in a direction of the inlet port of the splitter body, the divider plate being configured to initially divide an input flow of agricultural product received at the input port into two separate product flows for subsequent delivery into the plurality of downstream flow channels, the divider plate extending along the central axis in the length-wise direction from an upstream edge of the divider plate to a downstream edge of the divider plate, the divider plate defining a planar profile along the central axis in the length-wise direction.

13. The agricultural product distribution system of claim 12, wherein the divider plate is configured to initially divide the input flow of agricultural product received at the input port into two separate, substantially equal product flows upstream of the at least two baffle plates.

14. The agricultural product distribution system of claim 13, wherein the splitter body extends in a cross-wise direction between a first sidewall and a second sidewall, the divider plate being spaced apart equally from the first sidewall and the second sidewall in the cross-wise direction.

15. The agricultural product distribution system of claim 12, wherein the upstream edge of the divider plate is positioned at or adjacent to the upstream end of the splitter body.

16. The agricultural product distribution system of claim 12, wherein at least one of the inlet port or a central outlet port of the plurality of outlet ports is aligned with the central axis.

17. The agricultural product distribution system of claim 12, wherein the at least two baffle plates are angled relative to the central axis.

18. The agricultural product distribution system of claim 12, wherein the as least two baffle plates are offset from the central axis in a cross-wise direction of the splitter body, the cross-wise direction extending perpendicular to the central axis.

19. The agricultural product distribution system of claim 12, wherein the at least two baffle plates include a first baffle plate and a second baffle plate spaced apart from the first baffle plate in a cross-wise direction of the splitter body such that a first downstream flow channel of the plurality of flow channels is defined directly between the first and second baffle plates, both of the first and second baffle plates being spaced apart from the first and second sidewalls in the cross-wise direction of the splitter body, the first downstream flow channel extending from an upstream edge of the first and second baffle plates to a corresponding outlet port of the plurality of outlet ports.

20. The agricultural product distribution system of claim 12, wherein the input tube comprises a dimple tube.

* * * * *